No. 804,178. PATENTED NOV. 7, 1905.
W. B. UPDEGRAFF.
CLEARANCE INDICATOR.
APPLICATION FILED MAR. 13, 1902.

2 SHEETS—SHEET 1.

Witnesses
Edward C. Rowland.
John C. Nolan

William Barrett Updegraff Inventor
By his Attorney W. B. Hutchinson.

No. 804,178. PATENTED NOV. 7, 1905.
W. B. UPDEGRAFF.
CLEARANCE INDICATOR.
APPLICATION FILED MAR. 13, 1902.
2 SHEETS—SHEET 2.
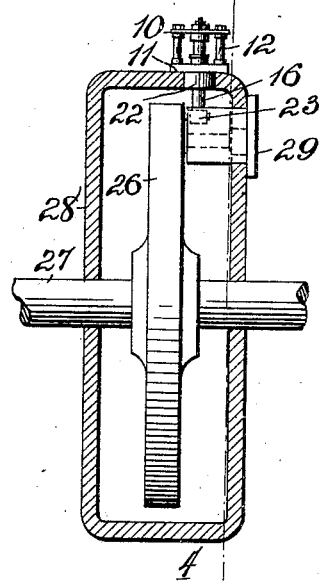
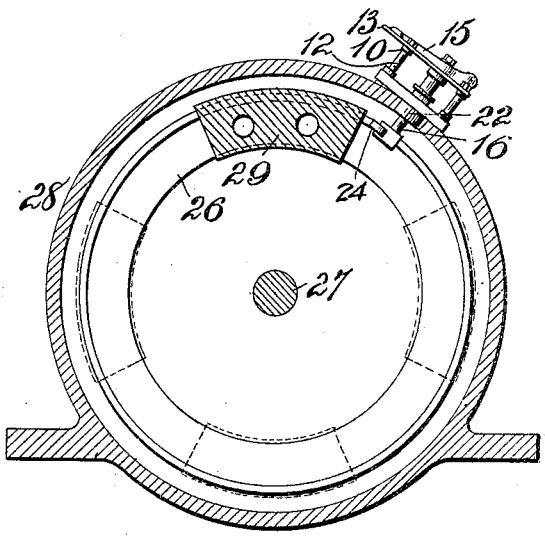
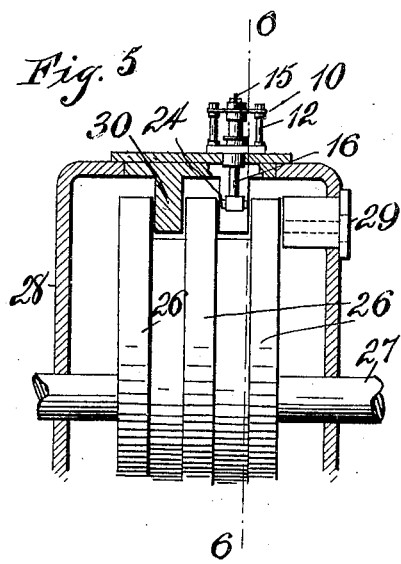
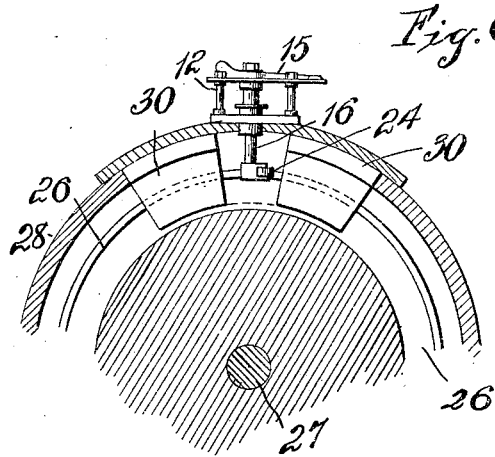
WITNESSES:
Wm H Canfield
J G Dunbar
INVENTOR
William B. Updegraff.
BY
W. B. Hutchinson.
ATTORNEY

UNITED STATES PATENT OFFICE.

WILLIAM BARRETT UPDEGRAFF, OF NEW YORK, N. Y., ASSIGNOR TO JOHN ROBERT TAYLOR, OF NEW YORK, N. Y.

CLEARANCE-INDICATOR.

No. 804,178.       Specification of Letters Patent.       Patented Nov. 7, 1905.

Application filed March 13, 1902. Serial No. 98,021.

*To all whom it may concern:*

Be it known that I, WILLIAM BARRETT UPDEGRAFF, of New York, county of Westchester, State of New York, have invented certain new and useful Improvements in Clearance-Indicators, of which the following is a full, clear, and exact description.

My invention relates to improvements in clearance-indicators, such as are used in determining and displaying the distance between a movable and a stationary part, and especially between the nozzle and bucket-rings of a steam or other turbine. It is desirable to have the nozzle of a turbine as close as possible to the bucket-ring thereof, and it is not always easy to determine just what is the distance between the two.

The object of my invention is to produce a very simple device which can be attached to and adapted to any usual form of turbine and by means of which the clearance between the nozzle and bucket-ring can be instantly and accurately determined and also to construct a device so that the said clearance can be indicated on a suitable scale.

To these ends my invention consists of a clearance-indicator the construction and arrangement of which will be hereinafter fully described and claimed.

Reference is to be had to the accompanying drawings, forming part of this specification, in which similar figures of reference refer to similar parts throughout the several views.

Figure 1:
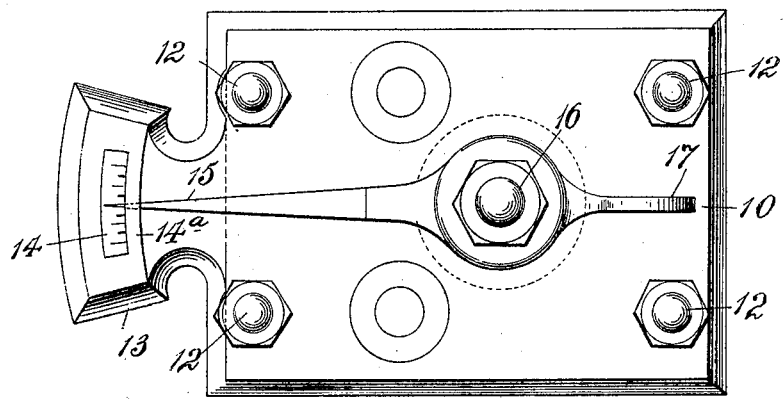
Figure 2:
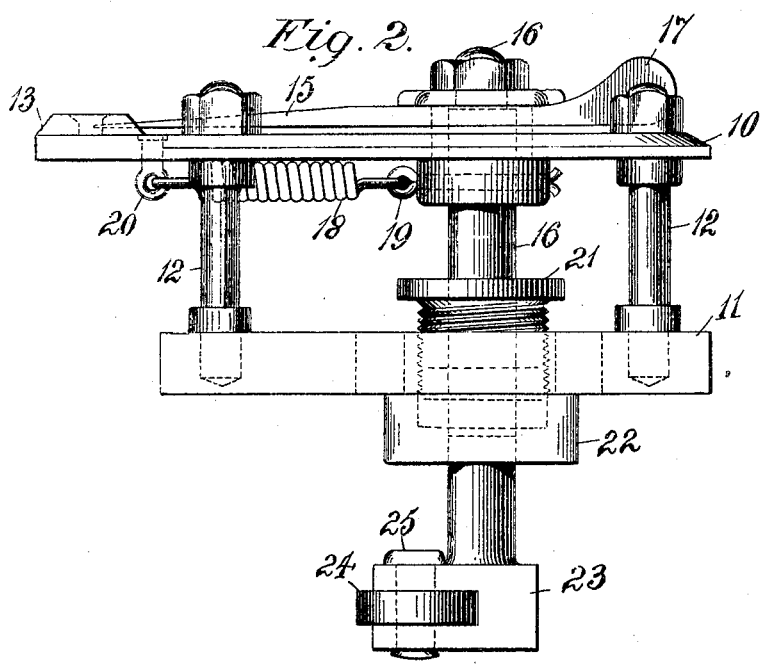

Figure 1 is a plan or face view of the device embodying my invention. Fig. 2 is a side elevation thereof. Fig. 3 is a cross-section of a turbine equipped with the new indicator. Fig. 4 is a section on the line 4 4 of Fig. 3. Fig. 5 is a sectional view similar to Fig. 3, but showing a turbine having several bucket-rings; and Fig. 6 is a broken section on the line 6 6 of Fig. 5.

My device comprises a suitable frame which can be of any preferred form, but as illustrated it serves the purpose well, comprising, as shown, the top plate 10 and the base-plate 11, these being spaced apart and fastened together by a common form of distance-bolt 12, several of these bolts being used. At one end the top plate 10 is prolonged, so as to form a little table 13, on which is produced the graduated scale 14 and over which moves the indicating-hand 15, the point of the hand passing underneath a bridge 14$^a$ of the table, so as to protect the hand; but this particular arrangement of the indicating means can be departed from without affecting the principle of the invention.

The hand 15 is fixed to a spindle 16, which is arranged vertically in the frame 10 11, and the hand has at its rear end the handle or tailpiece 17, by which it can be moved. The hand is kept normally at a zero or central position by a spring 18, which, as shown, is an ordinary spiral spring, though any suitable form of spring can be used, and the spring 18 is at one end fixed to a key 19, which is fastened in the spindle 16, and at the other end the spring is attached to an eye 20 on the under side of the plate 10. It will be seen that by pressing the tailpiece 17 the hand 15 may be turned one way or the other, and the spring 18 will return it to zero position.

The spindle 16 extends downward through a stuffing-box 21 and boss 22 on the plate 11, the spindle terminating at its lower end in a foot 23, in which is pivoted a roller 24, turning on a pin 25. This roller is intended to contact with the bucket-ring or other movable part when the spindle is turned; but obviously the measuring would be the same if the contacting part were fixed—as, for instance, a cam or rounding surface; but the roller is preferable, as it is more durable and avoids friction.

In applying the device the boss 22 fits into a corresponding opening in the case of the turbine. The turbine may be of any usual kind, and in Figs. 3 and 4 I have shown a single bucket-ring 26, fastened to a shaft 27 and inclosed by a casing 28. With this type of turbine the nozzle 29, which may be of any usual type, is placed in the side or end of the casing 28 as near as possible to the bucket-ring 26. The clearance-indicator is placed in the face or circumference of the casing, preferably in close proximity to the nozzle, so that when in center or zero position the side of the roller 24 which comes next the bucket-ring will be flush with the inner face of the nozzle 29. Then by turning the handle 17 so as to move the foot 23 against the tension of the spring 18 the hand 15 will be correspondingly moved, and the clearance—that is, the distance between the nozzle-face and the bucket-ring—will be indicated on the scale. It will be seen that it makes but little difference how the spindle 16 and the indicator are supported if only the arrangement is such as to produce a fixed relation between the inner surface of the contacting part 24 and the inner face of the nozzle 29, because the nozzle is stationary, and in adjusting the bucket-ring it is customary to move the ring and its shaft 27 instead of moving the accessory parts.

In some cases a series of bucket-rings 26 is used, and in such instances a stationary bucket-plate 30 is used, which, as is well known, is provided with buckets arranged oppositely to those of the movable ring 26, so that the direction of the steam will be reversed as it passes from one ring to the other. This, however, forms no part of my invention; but in such type of turbine the stationary bucket-plates can be broken away, as shown in Fig. 6, so as to provide for the clearance-indicator, which can be placed opposite one rim of a movable bucket-ring, as already described and as the drawing shows, and used to show the distance between the bucket-plates and the movable bucket-rings.

From the foregoing description it will be clearly seen that the form of my improved device is not very essential, but that the real invention lies in producing this movable device, which has a fixed relation to the inner face of the nozzle and which when moved will indicate the clearance.

Having thus described my invention, what I claim as new, and desire to secure by Letters Patent, is—

1. A device of the class described, comprising a support, a spindle mounted therein and provided at its lower end with a foot, a graduated scale on the upper part thereof, a hand carried on the spindle and extending over the graduated scale, a spring for returning the hand to the center of the scale from either side.

2. A device of the class described, comprising a support, a scale thereon, a spindle mounted therein and provided with a hand extending over the scale, said spindle having a foot on its lower end, and a spring for returning said hand and foot with the spindle to bring the hand to the center of the scale from either side.

3. A device of the class described, comprising a support, a scale thereon, a spindle mounted therein provided with a foot on the lower end, a hand on said spindle extending over said scale and adapted to operate said spindle and foot, and a spring to maintain the hand at and return it to the center of the scale from either side.

4. An indicator adapted to be attached to a casing to indicate the positions of parts relative to one another, consisting of a frame having a prolonged top to form a table, a scale on the table, a spindle journaled vertically in the frame and projecting beneath the same, a foot provided with a roller to engage the parts whose position is desired to be known, on the inner end of said spindle, a hand carried by the outer end of the spindle to move over the scale, a handle to move the spindle and its foot and hand to bring the roller in the above-described engagement, and a spring to return the movable parts to zero.

In testimony whereof I have signed my name to this specification in the presence of two subscribing witnesses.

WILLIAM BARRETT UPDEGRAFF.

In presence of—
CHARLES H. KENNEY,
FRANK J. SMITH.